United States Patent [19]

Olsen

[11] Patent Number: 5,799,747
[45] Date of Patent: Sep. 1, 1998

[54] BICYCLE POWER ASSIST

[76] Inventor: Randall Bruce Olsen, 3025 Via de Caballo, Encinitas, Calif. 92024

[21] Appl. No.: 785,703

[22] Filed: Jan. 17, 1997

Related U.S. Application Data

[63] Continuation of Ser. No. 679,936, Jul. 15, 1996, abandoned, which is a continuation of Ser. No. 349,909, Dec. 6, 1994, abandoned, which is a continuation of Ser. No. 29,705, Mar. 11, 1993, abandoned.

[51] Int. Cl.⁶ .................................................. B62M 23/02
[52] U.S. Cl. ................................................ 180/221; 180/206
[58] Field of Search .................................. 180/206, 220, 180/221, 65.1, 65.2

[56] References Cited

U.S. PATENT DOCUMENTS

| | | | |
|---|---|---|---|
| 3,773,131 | 11/1973 | Jaulmes | 180/206 |
| 3,961,678 | 6/1976 | Hirano et al. | 180/221 |
| 3,991,843 | 11/1976 | Davidson | 180/206 |
| 4,044,851 | 8/1977 | Shaw et al. | 180/206 |
| 4,113,043 | 9/1978 | Palmer | 180/221 |
| 4,122,907 | 10/1978 | Davidson et al. | 180/206 |
| 4,386,675 | 6/1983 | Landon | 180/221 |
| 5,316,101 | 5/1994 | Gannon | 180/221 |

FOREIGN PATENT DOCUMENTS 2170458  8/1986  United Kingdom ................. 180/221

*Primary Examiner*—Kevin Hurley

[57] ABSTRACT

To encourage the use of bicycles for both recreation and transportation by reducing the normally excessive load on the cyclist during hill climbing. A simple on/off push button controls the power assist while a clutch automatically handles both engagement and disengagement. The invention enables a powerful (80 to 150 watts of power delivered to the bicycle tire), compact, lightweight (2.5 to 4 kg) system capable of boosting a cyclist during the hills of a 1 to 2 hour bicycle ride. The system is compatible with most bicycles, is easy to install yet includes a theft deterrent mount. The system includes several safety features including a very modest high speed limit (e.g. 12 mph) beyond which power assist is automatically disabled, and a modest power level which can be overridden by normal bicycle brakes.

7 Claims, 3 Drawing Sheets

BICYCLE POWER ASSIST

This application is a continuation of Ser. No. 08/679,936 filed Jul. 15, 1996, now abandoned, which is a continuation of Ser. No. 08/349,909 filed Dec. 6, 1994, now abandoned, which is a continuation of Ser. No. 08/029,705 filed Mar. 11, 1993, now abandoned.

FIELD OF THE INVENTION invention relates primarily to the addition of artificial power assistance to bicycles

BACKGROUND OF THE INVENTION

After car traffic and inclement weather, hill climbing presents the greatest obstacle to increased use of bicycles. The present invention is directed to reducing the physical exertion of a bicycle rider when pedaling up hills and to increase the rider's speed and enjoyment.

Previous attempts to add power to bicycles have severely compromised the essence of cycling. The most commercially successful such powered bicycles are motorcycles. Motorcycling, while fulfilling to many of its enthusiasts is a very different experience than cycling. Motorcycling is exciting to those enthusiasts because of its unnaturally high power. However, motorcycling creates pollution (both air and sound) and eliminates exercise, whereas cycling is clean, quiet and beneficial to the cyclist's mental and physical health.

Previous attempts to overcome the noise and air pollution problems of motorcycles have centered on electrified bicycles. Many inventors have toiled for years producing overweight, over-expensive, underpowered electric motorcycles. These electric motorcycles have enjoyed only occasional and brief commercial success, (usually in months following an oil shortage). Such inventive attempts have battled against fundamental physics which indicate that any such inventions will continue to be disappointing (until some unexpected materials discoveries occur) when compared with internal combustion-based motorcycles.

As is true with many of today's new technological "advances" the needs of the customer (and the needs of planet earth) have been overlooked when seeking ways to improve cycling with power assist. One of the primary benefits of cycling is that human effort is required for propulsion. Unfortunately, many people have growed up so immersed in a technological society that they don't understand (or appreciate on an intuitive level) that humans require much more activity than modern society demands. Our unnatural society has created millions of overstressed commuters who think that it is easier to sit in automobiles crawling along expressways than to use that time to give their bodies and their minds the aerobic activity they need.

While the present invention will not directly address this educational problem, it will make the cycling experience more practical and enjoyable. Thus, the present invention may serve as a catalyst for a much broader appreciation of the overall benefits of cycling.

SUMMARY OF THE INVENTION

It is therefore an object of the present invention to provide a power assist system for a human powered vehicle that overcomes the limitations of the prior art. More specifically, it is an object of this invention to provide a compact, lightweight power assist system that has an integral automatic clutch for engaging and disengaging power assist at appropriate times during the operation of the vehicle.

In accordance with the present invention, the power assist system includes a battery powered motor with a drive mechanism for delivering the rotary power generated by the motor to a wheel of the human powered vehicle. The motor and drive mechanism are mounted as a unit to a hinged bracket that is, in turn, mounted to the frame of the vehicle. The bracket is mounted such that its movement pivots the drive mechanism toward the driven wheel of the vehicle to engage power assist and pivots the drive mechanism away from the driven wheel to disengage power assist.

In operation, the structure of the power assist unit described above provides an automatic clutch to engage and disengage the drive mechanism. The reaction torque created by the motor, for example, during motor startup, causes the hinged bracket to pivot towards the driven wheel thus engaging the drive mechanism. Furthermore, when the rotational speed of the driven wheel reaches a speed at which the motor attains a no-load condition, the hinged bracket pivots away from the driven wheel, disengaging the drive mechanism. By providing automatic coupling and decoupling as an intrinsic feature of the mounting structure, additional mechanical complexity and, therefore, size and weight is avoided. In addition, the automatic disengagement of the drive means at high vehicle speed helps ensure rider safety.

In the preferred embodiment, the drive mechanism includes a cylindrical roller or drive wheel which is mounted across the outer edge of the driven wheel of the vehicle. The battery powered motor is mounted so that the axis of the motor shaft is parallel with the axis of the drive wheel of the drive mechanism. The drive mechanism also includes a transmission system for transmitting the high-RPM rotary power of the motor to the low-RPM rotational speed of the driven wheels. By incorporating the transmission mechanism, the power assist system of the present invention can employ a high-RPM motor, which provides high power with relatively low mass. In addition, the parallel mounting of the motor and drive wheel minimizes the amount of space occupied by the power assist unit and ensures that a simple belt and pulley transmission system can be used.

In accordance with another aspect of the invention, a mechanism is provided for forcing the drive wheel against the driven wheel of the vehicle beyond the motor no-load point. At this point, the power assist unit acts as a regenerator and the motor/generator provides a recharging current to the battery system. The battery system includes a regenerative charging circuit that delivers the recharging current to the battery and also includes a thermostat switch which protects the battery from overcharging. As a result of this regenerative recharging, the power assist system can be used for longer periods of time. This mode of operation is particularly useful for long trips where the vehicle spends a significant amount of time coasting downhill.

Although the invention can be used with a variety of wheeled vehicles, it is uniquely adapted for use with a bicycle. The system includes a high-powered battery system that is adapted to fit within the water bottle cages found on many bicycles. Moreover, the power assist unit described above can mount on the seat tube of an ordinary bicycle for use with the rear wheel of the bicycle. This location provides compatibility with most bicycles while minimizing interference with the handling and the esthetics of the bicycle.

Other objects and features of the invention will be apparent from the following description and from the drawings.

DESCRIPTION OF THE PREFERRED EMBODIMENT

Figure 1:
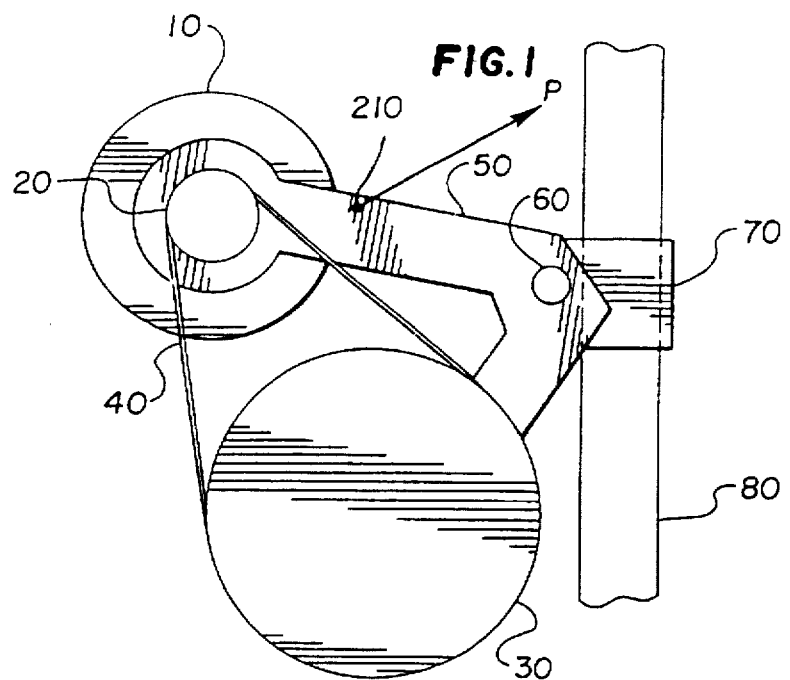
FIG. 1 and FIG. 2 are simplified side and rear schematic views, respectively, of a motor, transmission and clutch assembly.

Referring to the drawings, motor 10 is connected to small pulley 20 which transmits mechanical power to a large pulley 30, and thus to a coaxially mounted drive wheel 190, by means of belt 40. Both motor 10 having reaction torque when being started from rest and large pulley 30 are mounted to bracket 50 which is rotatably mounted on axis 60 to clamp 70. Small pulley 20, belt 40 and large pulley 30 form a transmission which is an example of a drive means which comprises a means for transferring the torque generated by said motor to a drive wheel at a rate of rotation different than that of said motor. More specifically said transmission is an example of a drive means which comprises a means for transferring the torque generated by said motor to a drive wheel at a rate of rotation lower than the rate of rotation of said motor. Clamp 70 firmly attaches the assembly to a bicycle frame seat tube 80. Axis 60 is seen to serve the dual purposes of attaching the clamp 70 and operating as a hinge pin for the bracket 50 and thus is an example of a combined clamp bolt and hinge pin. The large pulley 30 and drive wheel 190 assembly is mounted on bracket 50 via bearings 90 and 100 and shaft 110 (which defines a rotation axis for drive wheel 30). The shaft 110 does not rotate and is held in bracket 50 by retainer rings 120 and 130. Bearing 100 is held onto shaft 110 by retainer rings 140 and 150, while bearing 90 is held on by retainer rings 160 and 170. The large pulley 30 and drive wheel 190 assembly is attached to bearing 90 by a set screw (not shown). This cantilevered shaft mounting system enables quick and easy disassembly for repair or replacement with a differently sized drive wheel (portion 190).

Figure 2:
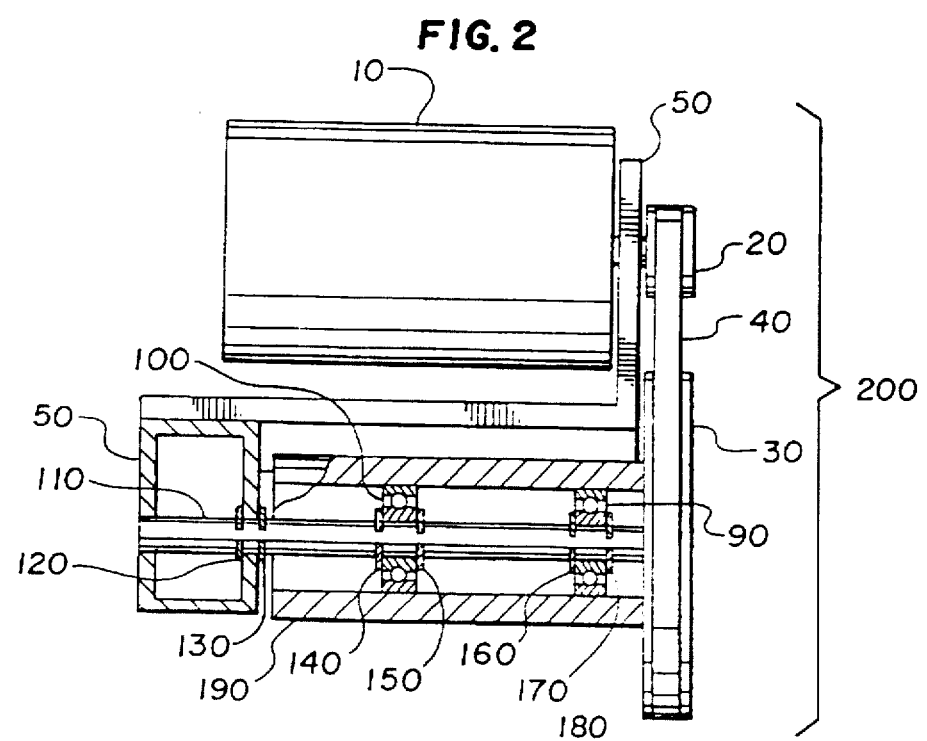

The assembly 200 shown in FIG. 1 and FIG. 2 is compact and lightweight. Assembly 200 minus the motor 10 is an example of a coupling means. Prototypes have been built which fit within the space defined by a bicycle's tire and frame (requiring, for example, less than 8 cm (3 inches) separation from tire to frame and a rider's legs, while weighing less than one kg (2 pounds). A variety of motors ban be used, but high speed (10,000 to 20,000 RPM) permanent magnet DC motors provide high power per unit mass, are reasonably efficient, low cost and available in large quantities. While the intent of this invention is that electric motors or similar clean power sources be used as a motive means, it is apparent that other less ecologically desirable sources (e.g. internal combustion engines) may also be used for these improvements.

Figure 3:
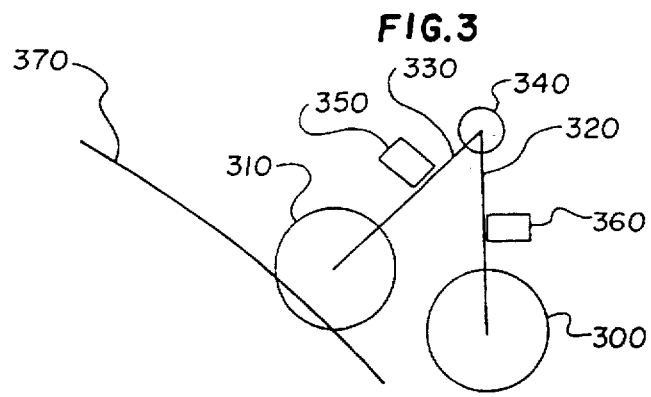
FIG. 3 is a schematic illustrating the operation of the automatic clutch mechanism.

FIG. 3 is a schematic representation of assembly 200 and illustrates an operating principle which enables automatic engagement and disengagement of the drive system. A drive wheel 190 is shown in the disengaged position 300 as dashed lines and in the engaged position 310 as solid lines. The drive wheel 190 is mounted to the hinged bracket 50 which pivots about axis 60 (position 310 disengaged, position 300 engaged). The range of motion of bracket 50 is limited between first stopper 350 and second stopper 360.

When motor 10 is started from rotational rest, torque begins to accelerate the rotor of motor 10. The reaction torque forces the bracket 50 to rotate and the drive wheel 190 to move, thus pushing against tire 370. As drive wheel 190 presses against tire 370, it rotates in a direction such that rotational energy is imparted to tire 370 as the tire rotates in a direction R. The direction of drive wheel 190 rotation r against bicycle tire 370 causes bracket 50 to rotate even farther in the same direction. With sufficient torque from the motor 10 and no other geometric constraints, the bracket 50 would continue to rotate through a closest-drive wheel-approach position (pushing the drive wheel 190 maximally into the tire 370) and onto an even greater angle (where the drive wheel 190 is pushed less and less into the tire 370. Said tire is an example of a driven wheel and disengaged position 300 is an example of a first location of a drive means when said drive means is disengaged from said driven wheel. Engaged position 310 is an example of a region of engagement which is higher than said first location, and eventually to a still greater angle where the drive wheel 190 would withdraw from touching the tire 370. However, the first stopper 350 is located to assure that pressing contact is maintained so long as the drive wheel 190 is exerting torque against the tire 370.

It has been discovered experimentally that low vibration is produced by assembly 200 when the first stopper 350 is located to restrict motion of the bracket 50 to slightly beyond the closest-drivewheel-approach position. This is an example where angular position of a drive means is greater than the angle of closest-drive wheel-approach. It is also possible to locate the first stopper 350 to restrict motion of the bracket 50 to less than the closest-drivewheel-approach position and thereby produce an automatically self adjusting torque mechanism. This is an example where angular position of a drive means is less than or equal to the angle of closest-drive wheel-approach. The higher the torque applied by the drive wheel 190 the greater the pressing force of contact between the drivewheel 190 and the tire 370. Since the amount of energy consumed in tire hysteresis loss per tire rotation depends on the amount of said pressing force, this automatic self adjusting torque mechanism can be used to produce a more highly efficient power transfer system. This system can be more efficient because when only low torque is demanded, only small pressing force (hence only small tire hysteresis loss) is used.

The automatic engagement can be activated simply by turning on motor 10. If the tire 370 is spinning at a rotational rate corresponding to certain road speeds (speed of the bicycle traveling down the road), then engagement will occur. If the road speed is too high engagement will not take place. The high speed limit for engagement is determined by geometry and corresponds to the motor rotational speed at which torque becomes so low that the drive wheel 190 cannot maintain its position against tire 370. Assuming the motor used is a permanent magnet DC type, this will occur at high RPM near the motor's no-load speed. To calculate the approximate corresponding road speed divide the motor's no-load RPM by the transmission ratio (i.e. size of the large pulley divided by the small pulley) to get the RPM of the drive wheel, then multiply the RPM of the drive wheel by the circumference of the drive wheel. This feature of automatic non-engagement provides safety. Above a certain speed the automatic engagement system prevents any power being transferred. In cycling applications, this means that power assist above a specific predetermined speed cannot occur. For example, several prototypes have been built which produce substantial power assist in the 5 to 10 mph range with diminishing power up to 12 mph at which speed non-engagement (or disengagement) occurs. This is an example wherein a drive means disengages from a driven wheel when a vehicle reaches a speed of 12 miles per hour. Disengagement is another safety feature. Even if a cyclist slows sufficiently to engage the power assist, as soon as the speed exceeds the preset disengagement speed, which is also near the motor's no-load speed for a weight compensated geometry (described in the next paragraph), the automatic system decouples the power. This is an example of a drive means which disengages from a driven wheel when said driven wheel rotates at greater than a predetermined rate of rotation. For a weight compensated geometry, this is an example of a drive means which disengages from a driven wheel when the drive motor rotates attains a no-load condition.

Figure 4:
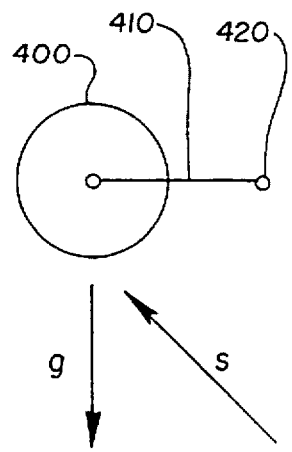
FIG. 4 shows the gravitational and balancing forces acting on a drive wheel.

FIG. 4 is a schematic which shows how the weight of the assembly can be compensated for to produce a larger speed range in which the automatic clutch can operate. The mass of the assembly is represented by lumped-mass 400, which is suspended via massless bracket 410 which rotates about axis 60. Without compensation for assembly weight, the drivewheel 150 torque against the tire 370 must provide a lifting force sufficient to lift the assembly. Experiments have shown that the road speed must be below about 7 or 8 mph to ensure automatic engagement (when no weight compensation was used for the geometry of the example). FIG. 4 shows that a downforce "g" caused by the weight of the lumped-mass 400 can be opposed by a counterforce "s". The counterforce need not be exactly equal, nor need it be exactly opposite to the downforce. All that is needed is that the vertical component of the counterforce be approximately equal in magnitude (but oppositely directed) to the downforce. When weight compensation was used in the example just cited, automatic engagement functioned up to about 10 or 11 mph. This is an example wherein a support means contains a weight compensation means for countering the weight of the motor, support means and drive means so that the drive means can engage with said driven wheel at higher vehicle speeds than would occur without such weight compensation. Counterforce can be provided by a variety of springs (compression, tension, torsion, etc.) or by other forcing means (e.g. magnetic.

Referring back to FIG. 2 it has been discovered experimentally that by controlling the stiffness of the bracket 50 one can control the low speed/low RPM characteristics of the assembly. This is useful for solving the high current/high torque problems inherent in some electrical motors. At low rotational speed some motors draw excessive amounts of power. Not only is this inefficient and wasteful of precious energy, but it is also potentially harmful to the motor. The motor windings can be overheated to the point of damage or secondary systems can fail rapidly. For example, motor bearings if overheated will lose their lubrication and fail. Also nearby items, plastic motor covers, bicycle parts etc. might be damaged by excessive temperatures.

One approach to preventing excessive temperatures is to monitor the current flowing through the motor electronically then with either analog or digital circuits control when (and for how long) the system should be shut down. In the presently preferred embodiment, the bracket 50 is sufficiently flexible so that when high torque/high current is produced, the bracket flexes causing slippage in the drive belt 40. The slipping generates an awful noise which signals the cyclist to turn off the motor. This approach is simple, inexpensive and rapidly trains the cyclists about which operating situations to avoid. For example, the cyclist should not start the motor when the bicycle is at a complete stop.

The auditory feedback of this approach (which could also be generated electronically) provides another safety feature.

In the occasion of a panic stop, the brakes of bicycle can overcome the torque of a 200 hundred watt motor. However, it is important that the motor be shut down to prevent any startling surges after the panic stop situation has been resolved. With the auditory feedback, the cyclist knows the motor is still on and can easily turn it off after using the brakes.

Figure 5:
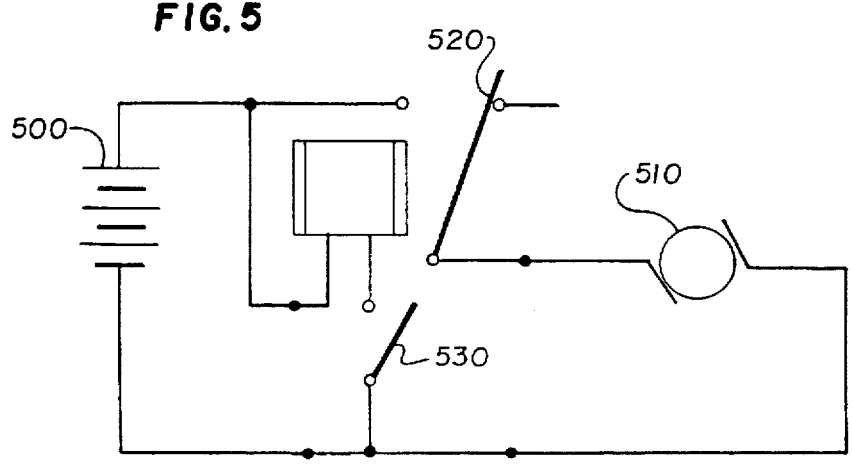
FIG. 5 is an electrical schematic showing a remotely controllable battery.

FIG. 5 shows a remotely controllable battery system which enables simple on/off push button control of the power assist. Battery 500 provides current to motor 10 when relay 520 is activated by switch 530. Battery 500 is an example of an energy storage means. Other examples include other electrical energy storage devices, and non-electrical storage devices including gasoline containers which may be used when the present invention is applied to less ecologically desireable power sources (e.g. internal combustion engines). Relay 520 is preferably a high current (greater than 10 Amperes) type to enable significant power control capability to the system. Relay 520 is a specific example of a power management device. Other examples include other switching devices (e.g. power transistors) and more sophisticated variable controllers (e.g. switched-mode power supply controllers). Switch 530, which is an example of a control means, may be a simple manual switch or a wireless system. The wireless system comprises a manually operated switch which activates a wireless transmitter, a wireless receiver, and a switch closure activated by the wireless receiver. Possible wireless transmissions include electromagnetic (radio, infrared, optical, etc.) and sound (including ultrasound). The transmissions can be encoded to prevent interference between two or more wireless systems.

Figure 6:
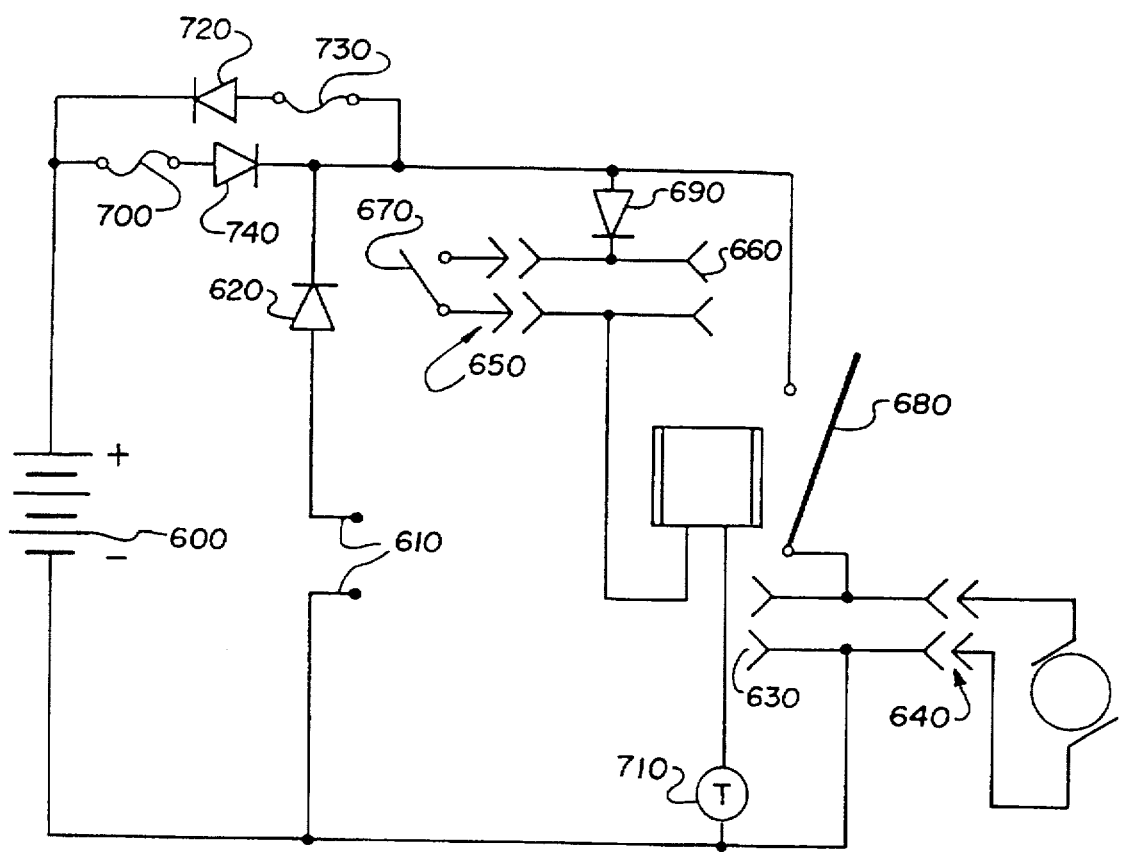
FIG. 6 is an electrical schematic showing the daisy-chaining and regenerative circuits of the battery system.

FIG. 6 shows a remotely controllable battery which can be connected with one or more other such batteries in a daisy-chain fashion. A characteristic of the daisy-chaining connection is that each additional battery which is added to the daisy-chain comprises enough connectors for yet more batteries to be added. Battery 500 can be recharged by connecting a battery charger to connector 610. Optional diode 620 protects battery 500 from being mistakenly "charged" with the incorrect polarity. If the optional diode 620 is not chosen (i.e. it is replaced by a simple conducting path), then the connector 610 can serve as an optional power port to deliver battery 500 energy to a wide variety of accessories (including lights, radios, horns, cellular phones, global positioning devices, and computers). Daisy-chaining of batteries is enabled by the dual high current connectors 630 and 640. Even more such connectors can be incorporated, but two are enough to provide the daisy-chaining capability.

The specific example shown in FIG. 6 also comprises a daisy-chain dual connection 650 and 660 for the switch line 670 which controls the high current relay 680. Diode 690 provides an example of an important isolation function. Without such a diode, the daisy chainable batteries would not be completely and automatically isolated during recharging. With diode 690, however, isolation is obtained. Isolation is important for some types of batteries (e.g. nickel-cadmium batteries) to avoid damaging overcharging.

The battery 500 is protected against accidental short-circuiting by fuse 700. Fuse 700 is a specific example of a current interrupting means. Other examples include circuit breakers and systems comprising electronic sensors which control high current relays. The battery 500 ( is protected during high current regenerative recharging (i.e. when the motor is used as a generator when, for example, the bicycle is coasting downhill) by a thermostat 710. The thermostat 710 senses the temperature of battery 600 and switches from a very low resistance state to a very high resistance state when a predetermined temperature is exceeded (which normally corresponds to excessive internal cell pressure). A common temperature for a Nickel-Cadmium battery thermostat is 45° C. The thermostat can be located within the cells of the battery or on its surface. When mounted on the battery's surface an advantage is gained for regenerative recharging in that a faster recovery time (time between when the thermostat causes the battery to be disconnected until the thermostat causes the battery to be reconnected) is produced. Optional diode 720 enables higher charging currents than would normally disrupt fuse 700. Optional fuse 730 establishes a safe maximum for recharge current while optional diode 740 protects fuse 700 from such recharge current.

As discussed earlier, the preferred coupling mechanism of this invention automatically disengages at a predetermined speed (12 mph in the example given). To enable regeneration with this coupling mechanism requires an independent means of forcing the drive wheel against the tire. This can be accomplished, for example by pulling on the point 210 in the direction indicated by vector P as shown in FIG. 1. The pulling for P can be provided by a cable or an actuator (e.g. a solenoid). The cable can be connected to an overcenter latch to positively lock the drivewheel against the tire.

The invention has been described as mounted on the seat tube of a bicycle. This particularly attractive location is the preferred one because it offers compatibility with the widest variety of bicycle designs, yet minimally disturbs both the handling and the esthetics of the bicycle. This location has been made possible by the invention by combining a small, high RPM motor with a drive system which essentially folds over on itself. This folding results in a compact system which is short enough not to interfere with the normal pedaling motions of a cyclist. Assembly 200 is an example of a folded-drive means.

It is clear that the invention can be mounted at other locations, for example behind the rear brakes or even on the forks (for use with the front tire). With such mounting it is even possible to eliminate the transmission and drive the tire directly from the motor shaft. While this direct shaft drive approach results in a lower cost, it also suffers from several disadvantages.

To match the high RPM (10,000 to 20,000) of a high power density motor to the low RPM (of the order of 100 at low road speed, e.g. 5 mph) of a bicycle wheel, a very small shaft-drivewheel must be used (about 6 mm). This results in inefficient power transfer as it has generally been found that rolling resistance is inversely proportional to wheel diameter (in this case the shaft-drivewheel's diameter). Also, it has been discovered experimentally that when the minimum diameter (limited to about 6 mm by practical bending considerations) shaft-drivewheel was field tested, motor bearing failure resulted. The bearing failure was experienced in motors with ball bearings as well as with the more common sleeve bearings. The failure resulted from the combined results of excessive side loading (due to the direct transfer geometry) and the fact that the shaft-drivewheel was really not sufficiently small enough in diameter to allow the motor to operate in its most efficient, higher RPM range. As a result of running at lower than efficient RPM, the motor generated excess heat, warmed itself (including its bearings) up to high temperature, which resulted in premature failure of the bearings.

It is possible to mount more than one motor system on a bicycle. One reason for using more than one motor is to produce a higher power assist. Another reason for doing this is to simply and compactly produce a system with a broader speed range. For example, a two motor system could include one drivewheel with a small diameter for low speed assist, and another drivewheel with a larger diameter for a higher speed assist. Since the motor and drive system is very compact and lightweight (under 1 kg), this multiple motor approach may be more practical than trying to incorporate multiple speeds into the transmission. However, this can also be accomplished by, for example, using a drivewheel which has two or more segments with different diameters plus a mechanism which shifts the region of contact between the drivewheel and the tire between the segments.

While the present invention has been described in terms of a common example, a bicycle, it should be clear that it is applicable to many other systems. The automatic coupling methods can be applied to any variety of rotating members including machinery used in manufacturing processes. It should also be clear that the word bicycle is representative of a much broader class of human powered vehicles including those with other than two wheels.

What is claimed is:

1. A power assist system in combination with a vehicle having at least one rotatable, driven wheel mounted to a frame, said power assist system comprising:

a selectively activatable motor for providing rotary power;

a drivewheel for transmitting the rotary power provided by said motor to the driven wheel of said vehicle; and support means pivotably mounted to the frame of said vehicle for supporting said motor and said drivewheel near to said driven wheel;

wherein reaction torque from said motor when activated causes said support means to pivot said drivewheel into engagement with said driven wheel and said motor is moved away from said driven wheel.

2. The power assist system of claim 1 wherein;

said drivewheel engages said driven wheel while said motor rotates at essentially less than no-load speed.

3. The power assist system of claim 1 wherein;

said drivewheel disengages said driven wheel when said motor provides approximately zero torque.

4. The power assist system of claim 1 wherein said support means includes a first stopper for limiting the pivoting movement of said support.

5. The power assist system of claim 4 wherein;

said first stopper is positioned so the angular position of said drivewheel is less than or equal to the angle of closest-drive-wheel-approach when said support means is fully pivoted toward said driven wheel against said first stopper.

6. The power assist system of claim 5 wherein;

said drivewheel exerts a normal force on said driven wheel and said normal force is an increasing function of the torque applied by said motor when said drivewheel is engaged with said driven wheel.

7. The power assist system of claim 4 wherein;

said first stopper is positioned so the angular position of said drivewheel is greater than the angle of closest-drive-wheel-approach when said support means is fully pivoted toward said driven wheel against said first stopper.

\* \* \* \* \*